(12) United States Patent
Kobayashi et al.

(10) Patent No.: US 9,075,784 B2
(45) Date of Patent: Jul. 7, 2015

(54) COMMUNICATION DEVICE, COMMUNICATION METHOD AND COMPUTER-READABLE RECORDING MEDIUM

(71) Applicant: KABUSHIKI KAISHA TOSHIBA, Minato-ku, Tokyo (JP)

(72) Inventors: Yuta Kobayashi, Kanagawa-ken (JP); Nobuhiko Sugasawa, Tokyo (JP); Masataka Goto, Kanagawa-ken (JP); Shinya Murai, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/033,804

(22) Filed: Sep. 23, 2013

(65) Prior Publication Data
US 2014/0095739 A1 Apr. 3, 2014

(30) Foreign Application Priority Data
Oct. 1, 2012 (JP) ................................. 2012-219725

(51) Int. Cl.
*G06F 13/24* (2006.01)
*G06F 1/32* (2006.01)
(52) U.S. Cl.
CPC ................ *G06F 13/24* (2013.01); *G06F 1/325* (2013.01); *G06F 1/3206* (2013.01); *G06F 1/3287* (2013.01); *G06F 1/3293* (2013.01); *Y02B 60/121* (2013.01); *Y02B 60/1282* (2013.01); *Y02B 60/32* (2013.01)
(58) Field of Classification Search
CPC ... G06F 1/3202; G06F 1/3256; G06F 13/385; G06F 3/16; G11C 7/1045

USPC .......................................................... 710/14
See application file for complete search history.

(56) References Cited

U.S. PATENT DOCUMENTS

| 6,041,368 | A | * | 3/2000 | Nakatsuji et al. ................ 710/20 |
| 6,095,985 | A | * | 8/2000 | Raymond et al. ............. 600/513 |
| 2006/0034611 | A1 | * | 2/2006 | Li ................................. 398/135 |
| 2009/0259863 | A1 | * | 10/2009 | Williams et al. .............. 713/323 |

FOREIGN PATENT DOCUMENTS

| JP | 2006-119982 | 5/2006 |
| JP | 2007-026075 | 2/2007 |

\* cited by examiner

*Primary Examiner* — Farley Abad
(74) *Attorney, Agent, or Firm* — Amin, Turocy & Watson, LLP

(57) ABSTRACT

There is provided a communication device which communicates with a target communication device, including: a communication controller, a general-purpose processing unit, a data transfer processing unit and a starting unit. The general-purpose processing unit communicates with the target communication device via the communication controller. The data transfer processing unit receives data from the target communication device via the communication controller. The starting unit starts up the data transfer processing unit. The general-purpose processing unit receives a data transfer start request from the target communication device. The starting unit starts up the data transfer processing unit when the general-purpose processing unit receives the data transfer start request. The general-purpose processing unit or the data transfer processing unit notifies a data transfer start response to the target communication device after the data transfer processing unit is started up.

15 Claims, 6 Drawing Sheets

COMMUNICATION DEVICE, COMMUNICATION METHOD AND COMPUTER-READABLE RECORDING MEDIUM

CROSS REFERENCE TO RELATED APPLICATIONS

This application is based upon and claims the benefit of priority from the prior Japanese Patent Application No. 2012-219725 filed on Oct. 1, 2012, the entire contents of which are incorporated herein by reference.

FIELD

Embodiments described herein relate to a communication device and a computer-readable recording medium.

BACKGROUND

Some conventional communication devices reduce interrupts to a CPU by processing data transfer between a memory and an I/O device by dedicated hardware (a DMA control device), and thereby speed up the data transfer. When data transfer such as file transfer is performed, the communication devices are switched from processing by the CPU to data transfer processing by the dedicated hardware after specifying a file size (a data volume). The dedicated hardware executes the data transfer processing of the specified data volume instead of the CPU.

However, there is a problem that the CPU may process a packet that should be processed by the dedicated hardware by mistake due to a timing of switching to the dedicated hardware. For example, a CPU of a transmitting terminal notifies, to a CPU of a receiving terminal, a file size by using a control packet, and file transfer is started by using the dedicated hardware. At this time, if the transmitting-side terminal starts the file transfer before the CPU is switched to the dedicated hardware in the receiving terminal, a packet received before the switching is mistakenly processed in the CPU. If ten packets of data are transmitted from the transmitting terminal, and the first two packets are received and processed by the CPU before the switching, the dedicated hardware receives only eight packets of data that are received after the completion of switching. The dedicated hardware comes into a state of continuously waiting for receiving the two remaining packets.

As described, the conventional technique has a problem in the case that the data transfer is performed with the CPU and the dedicated hardware switched: the CPU may process the packet that should be processed by the dedicated hardware by mistake due to start and end timings of data transfer using the dedicated hardware.

DETAILED DESCRIPTION

According to some embodiments, there is provided a communication device which communicates with a target communication device, including: a communication controller, a general-purpose processing unit, a data transfer processing unit and a starting unit.

The general-purpose processing unit communicates with the target communication device via the communication controller.

The data transfer processing unit receives data from the target communication device via the communication controller.

The starting unit starts up the data transfer processing unit.

The general-purpose processing unit receives a data transfer start request from the target communication device.

The starting unit starts up the data transfer processing unit when the general-purpose processing unit receives the data transfer start request.

The general-purpose processing unit or the data transfer processing unit notifies a data transfer start response to the target communication device after the data transfer processing unit is started up.

Hereinafter, embodiments will be described with reference to the accompanying drawings.

First Embodiment

The present embodiment is characterized in that a transmitting side starts data transfer after ensuring starting up of dedicated hardware on a receiving side. This is achieved by controlling start and stop timings of a high-speed transfer processing unit, which is the dedicated hardware in the transmitting side. The control can made by using transmission and reception of a control packet with a target communication device. In the following, the present embodiment will be described in detail.

Figure 1:
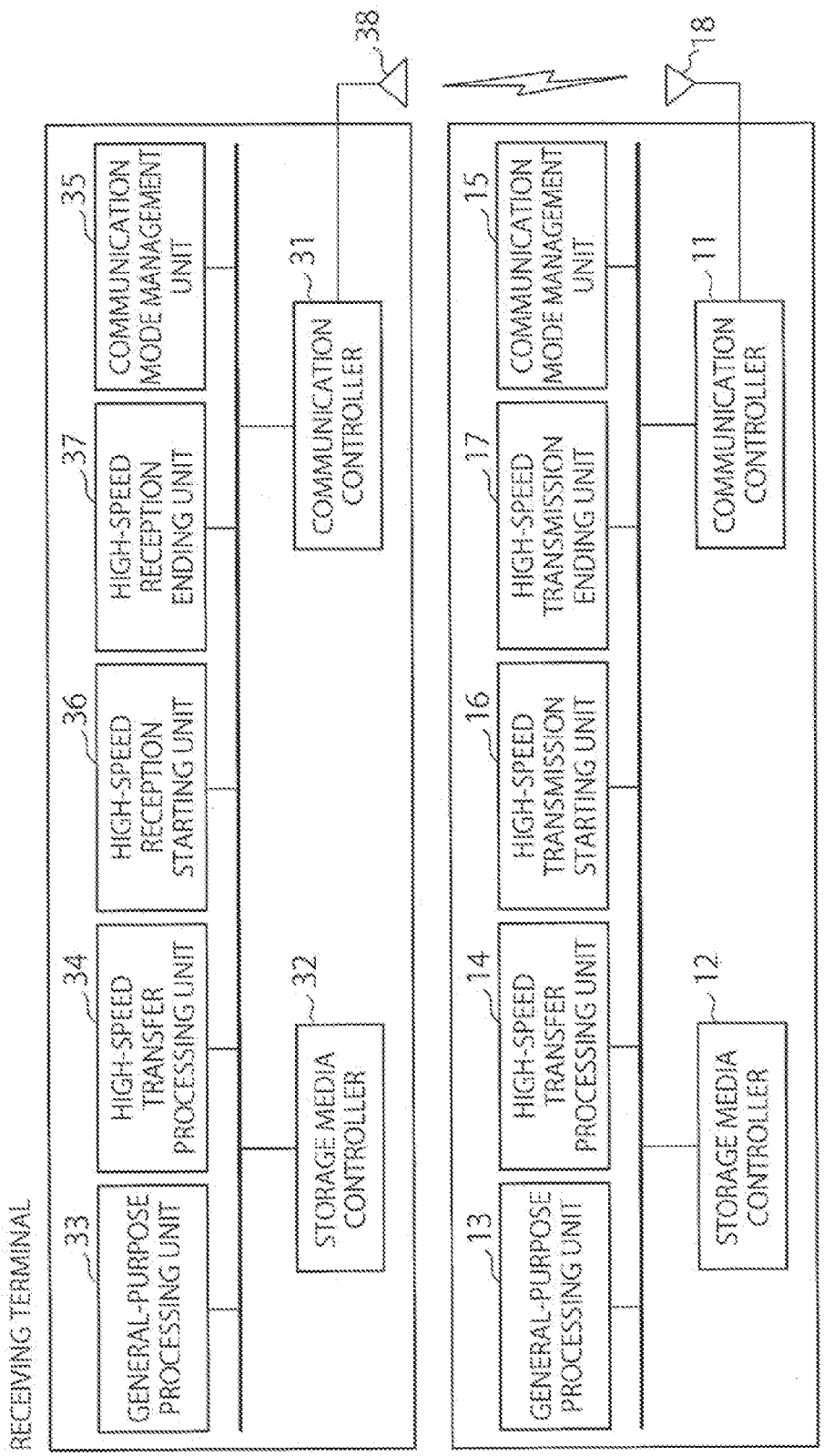
FIG. 1 is a block diagram illustrating communication devices according to a first embodiment.

FIG. 1 is a block diagram illustrating communication devices according to the first embodiment. Two communication devices: a transmitting terminal and a receiving terminal are shown.

The transmitting terminal includes a communication controller 11, a storage media controller 12, a general-purpose processing unit 13, a high-speed transfer processing unit 14, a communication mode management unit 15, a high-speed transmission starting unit 16, and a high-speed transmission ending unit 17.

The receiving terminal includes a communication controller 31, a storage media controller 32, a general-purpose processing unit 33, a high-speed transfer processing unit 34, a communication mode management unit 35, a high-speed reception starting unit 36, and a high-speed reception ending unit 37.

The general-purpose processing units 13 and 33 are composed of a CPU, a memory, or the like, and execute general-purpose processing using software.

The high-speed transfer processing units 14 and 34 perform processing regarding data transfer. The high-speed transfer processing units 14 and 34 are partially or entirely achieved by hardware. The high-speed transfer processing units 14 and 34 can perform data transfer at higher speed than data transfer processed by the general-purpose processing units. The high-speed transfer processing units 14 and 34 are, for example, DMA control devices.

The communication mode management units 15 and 35 store a value indicating one of a first communication mode and a second communication mode. The value indicating the first communication mode corresponds to a first value, and the value indicating the second communication mode corresponds to a second value. The value indicating the first communication mode and the value indicating the second communication mode can be used when the communication controllers 11 and 31, and the storage media controllers 12 and 32 control output destinations of interrupt signals from themselves. For example, when the value indicating the first communication mode is stored, interrupt signals are output to the general-purpose processing units 13 and 33. When the value indicating the second communication mode is stored, interrupt signals are output to the high-speed transfer processing units 14 and 34. Since the output control of the interrupt signal is not the essence of the present embodiment, and is mainly described below in a following second embodiment, the detailed description thereof is omitted here.

The high-speed reception starting unit 36 of the receiving terminal starts up the high-speed transfer processing unit 34 when receiving a data transfer start request from the target communication device (the transmitting terminal).

The high-speed transmission starting unit 16 of the transmitting terminal starts up the high-speed transfer processing unit 14 when receiving a data transfer start response from the target communication device (the receiving terminal).

The high-speed reception ending unit 37 of the receiving terminal stops the high-speed transfer processing unit 34 when reception of data having a data volume (i.e., data size) notified by the data transfer request from the target communication device (the transmitting terminal) is completed.

The high-speed transmission ending unit 17 of the transmitting terminal stops the high-speed transfer processing unit 14 when receiving a data transfer end request transmitted from the target communication device (the receiving terminal).

The high-speed transmission starting unit 16, the high-speed transfer processing unit 14, the general-purpose processing unit 13, and the high-speed transmission ending unit 17 can write values into the communication mode management unit 15. The high-speed reception starting unit 36, the high-speed transfer processing unit 34, the general-purpose processing unit 33, and the high-speed reception ending unit 37 can write values into the communication mode management unit 35.

The high-speed transmission starting unit 16 and the high-speed transmission ending unit 17 of the transmitting terminal described above may be achieved by software executed by the general-purpose processing unit 13, or by hardware connected to a bus. In the present embodiment, a case in which these elements are achieved by software executed by the general-purpose processing unit 13 is assumed. The communication mode management unit 15 may be achieved by software by the general-purpose processing unit 13, or by hardware connected to a bus.

Similarly, the high-speed reception starting unit 36 and the high-speed reception ending unit 37 of the receiving terminal may be achieved by software executed by the general-purpose processing unit 33, or by hardware connected to a bus. In the present embodiment, a case in which these elements are achieved by software executed by the general-purpose processing unit 33 is assumed. The communication mode management unit 35 may be achieved by software by the general-purpose processing unit 33, or by hardware connected to a bus.

The storage media controller 12 of the transmitting terminal controls access (reading/writing) to an unillustrated storage medium (e.g., a memory device such as a NAND flash memory, and a hard disk). The general-purpose processing unit 13 and the high-speed transfer processing unit 14 read and write data to the storage medium by controlling the storage media controller 12.

Similarly, the storage media controller 32 of the receiving terminal controls access to an unillustrated storage medium. The general-purpose processing unit 33 and the high-speed transfer processing unit 34 read and write data to the storage medium by controlling the storage media controller 32.

The communication controller 11 of the transmitting terminal is a communication controller for wire communications or wireless communications. For example, the communication controller 11 is a communication controller such as Ethernet, IEEE802.11a/b/g, and Bluetooth. In the present embodiment, the communication controller 11 transmits and receives packet data to and from the target communication device by using an antenna 18. The general-purpose processing unit 13 and the high-speed transfer processing unit 14 perform data transfer with the general-purpose processing unit 33 and the high-speed transfer processing unit 34 of the target communication device (the receiving terminal) by controlling the communication controller 11.

The communication controller 31 of the receiving terminal is a communication controller for wire communications or wireless communications. For example, the communication controller 31 is a communication controller such as Ethernet, IEEE802.11a/b/g, and Bluetooth. In the present embodiment, the communication controller 31 transmits and receives packet data to and from the target communication device (the transmitting terminal) by using an antenna 38. The general-purpose processing unit 33 and the high-speed transfer processing unit 34 perform data transfer with the general-purpose processing unit 13 and the high-speed transfer processing unit 14 of the target communication device by controlling the communication controller 31.

The aforementioned respective elements within the transmitting terminal are connected to each other via a bus. The aforementioned respective elements within the receiving terminal are also connected to each other via a bus. The bus may have a single stage, or multiple stages.

Figure 2:
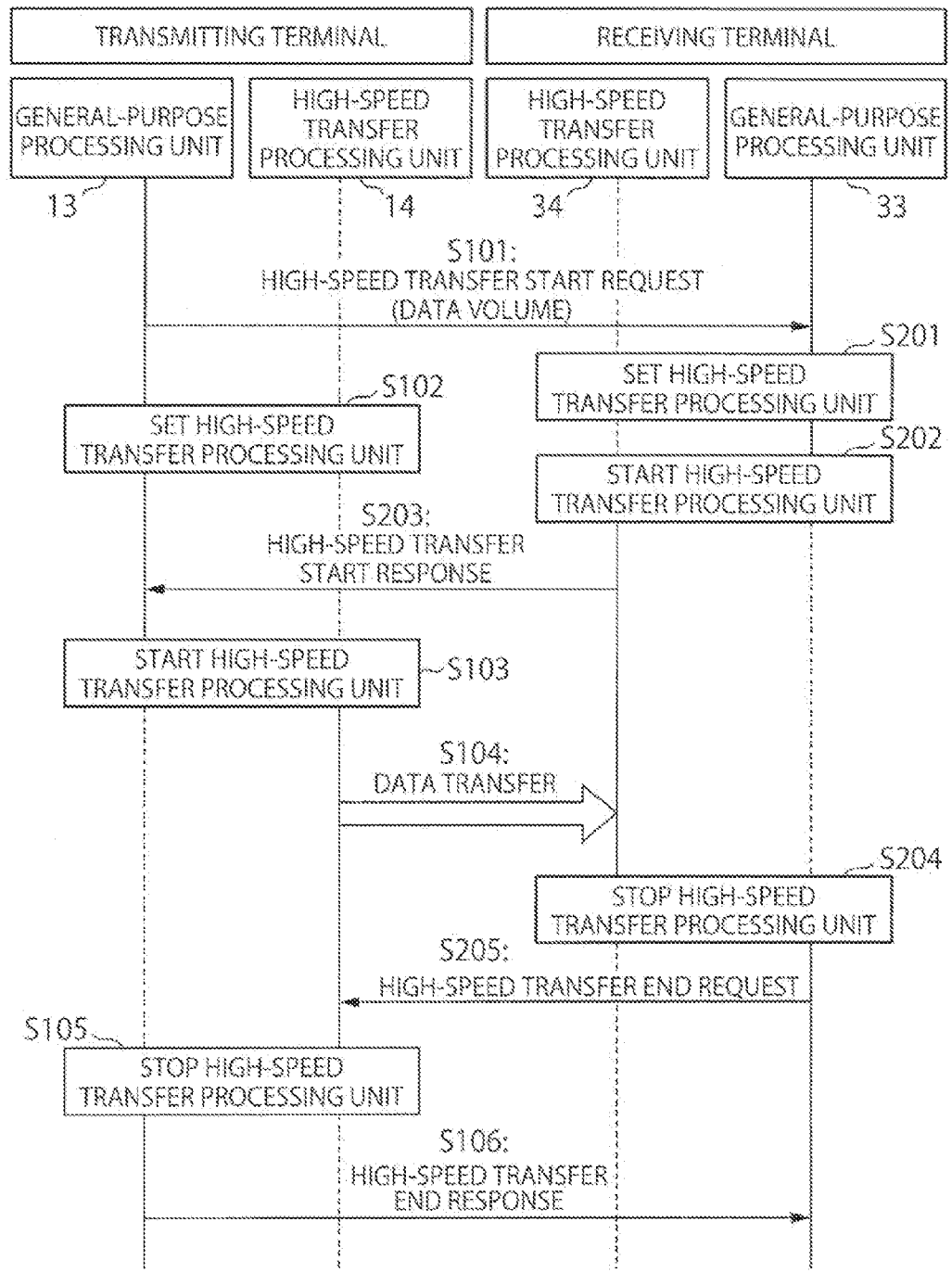
FIG. 2 is a sequence diagram illustrating operations of a transmitting terminal and a receiving terminal according to the first embodiment.

Next, operations of the transmitting terminal and the receiving terminal according to the first embodiment will be described based on FIGS. 1 and 2. FIG. 2 is a sequence diagram illustrating operations of the transmitting terminal and the receiving terminal according to the first embodiment. In the following description, an OBEX protocol will be described as an example of a communication protocol.

First, the operation of the transmitting terminal will be described. It is assumed that the value indicating the first communication mode is stored in the communication mode management unit 15 as an initial value.

First, the general-purpose processing unit 13 of the transmitting terminal transmits a high-speed transfer start request to the receiving terminal (S101). The high-speed transfer start request includes a data volume to be transferred by data transfer. For example, the high-speed transfer start request is a PUT Request packet including a Length header of the OBEX protocol. The data volume may not be necessarily included in the high-speed transfer start request, and may be notified before transmitting the high-speed transfer start request.

Subsequently, the general-purpose processing unit 13 of the transmitting terminal sets information necessary for the data transfer in the high-speed transfer processing unit 14 (S102). Examples of the set information include a direction of transmission/reception, a data size (data volume) to be transferred, and a storage position in the storage medium.

When the general-purpose processing unit 13 finishes setting the information in the high-speed transfer processing unit 14, and receives a high-speed transfer start response from the receiving terminal (S203), the high-speed transmission starting unit 16 of the transmitting terminal sets the value indicating the second communication mode in the communication mode management unit 15, and starts up the high-speed transfer processing unit 14 (S103). Here, the high-speed transfer start response is, for example, a Put Response packet of the OBEX protocol. The setting of the value in the communication mode management unit 15 may be also performed by another processing unit such as the general-purpose processing unit 13.

Subsequently, the started-up high-speed transfer processing unit 14 starts data transmission (S104). The high-speed transfer processing unit 14 executes header analysis/generation of the communication protocol, control of the communication controller 11, control of the storage media controller 12, or the like without involving the general-purpose processing unit 13. For example, the high-speed transfer processing unit 14 performs a series of processing of reading out data transmitted from the storage media controller 12, storing the data in a Body header of an OBEX Put packet, and writing the data into the communication controller 11.

Subsequently, the high-speed transmission ending unit 17 of the transmitting terminal stops the high-speed transfer processing unit 14 upon receiving a high-speed transfer end request (S205) from the receiving terminal (S105). The high-speed transmission ending unit 17 sets the value indicating the first communication mode in the communication mode management unit 15. The general-purpose processing unit 13 then transmits a high-speed transfer end response to the receiving terminal (S106). The high-speed transfer processing unit 14 may also transmit the high-speed transfer end response instead of the general-purpose processing unit 13. The setting of the value in the communication mode management unit 15 may be also performed by another processing unit such as the general-purpose processing unit 13.

The communication controller 11 may switch an interrupt destination to the high-speed transfer processing unit 14 when instructed by the high-speed transfer processing unit 14 or the general-purpose processing unit 13 in response to the reception of the high-speed transfer start response (S203) from the receiving terminal. In this case, when receiving a packet, the communication controller 11 outputs an interrupt signal to the high-speed transfer processing unit 14. The communication controller 11 may also switch the interrupt destination to the general-purpose processing unit 13 when instructed by the general-purpose processing unit 13 or the high-speed transfer processing unit 14 in response to the reception of the high-speed transfer end request (S205).

Alternatively, the communication controller 11 may be configured to refer to the communication mode management unit 15, and output an interrupt signal to the high-speed transfer processing unit 14 when the value indicating the second communication mode is set, and output an interrupt signal to the general-purpose processing unit 13 when the value indicating the first communication mode is set. The storage media controller 12 may be also configured to output an interrupt signal to the high-speed transfer processing unit 14 when the value indicating the second communication mode is set, and output an interrupt signal to the general-purpose processing unit 13 when the value indicating the first communication mode is set. The same applies to the receiving side. The communication mode management unit 15 can be used for controlling the output destination of the interrupt signal as described above. The same applies to the communication mode management unit 35 of the receiving terminal.

The operation of the transmitting terminal has been described above.

Next, the operation of the receiving terminal will be described. It is assumed that the value indicating the first communication mode is set in the communication mode management unit 35 as an initial value.

First, the general-purpose processing unit 33 of the receiving terminal sets information necessary for the data transfer in the high-speed transfer processing unit 34 when receiving the high-speed transfer start request (S101) from the transmitting terminal (S201). The high-speed reception starting unit 36 sets the value indicating the second communication mode in the communication mode management unit 35, and starts up the high-speed transfer processing unit 34 (S202). The started-up high-speed transfer processing unit 34 transmits the high-speed transfer start response (S203). The general-purpose processing unit 33 or the high-speed reception starting unit 36 may also transmit the high-speed transfer start response instead of the high-speed transfer processing unit 34. The setting of the value in the communication mode management unit 35 may be also performed by another processing unit such as the general-purpose processing unit 33. When started up in step S202, the high-speed transfer processing unit 34 comes into a state capable of receiving data from the transmitting terminal.

The setting of the value in the communication mode management unit 35 may be also performed after starting up the high-speed transfer processing unit 34. In this case, the high-speed transfer processing unit 34 may transmit the high-speed transfer start response after confirming that the value indicating the second communication mode is set in the communication mode management unit 35. Alternatively, the value indicating the second communication mode may be set in the communication mode management unit 35 immediately after the high-speed transfer start response is transmitted.

Subsequently, the high-speed transfer processing unit 34 of the receiving terminal starts receiving the data transferred from the high-speed transfer processing unit 14 of the transmitting terminal (S104). The high-speed transfer processing unit 34 executes header analysis/generation of the communication protocol, control of the communication controller 31, control of the storage media controller 32, or the like without involving the general-purpose processing unit 33. For example, the high-speed transfer processing unit 34 performs a series of processing of reading out the received data from the communication controller 31, analyzing the OBEX PUT packet, and writing the data stored in the Body header into the storage media controller 32 when the packet is correct.

Here, the communication controller 31 may switch an interrupt destination at the time of receiving the data from the transmitting terminal to the high-speed transfer processing unit 34 in advance when instructed by the high-speed transfer processing unit 34 or the general-purpose processing unit 33. At this point, when receiving the data, the communication controller 31 outputs an interrupt signal to the high-speed transfer processing unit 34. The communication controller 31 may also switch the interrupt destination to the general-purpose processing unit 33 when instructed by the high-speed transfer processing unit 34 or the general-purpose processing unit 33 in response to ending of the data transfer or stopping of the high-speed transfer processing unit 34.

Alternatively, the communication controller 31 may be configured to refer to the communication mode management unit 35, and output an interrupt signal to the high-speed transfer processing unit 34 when the value indicating the second communication mode is set, and output an interrupt signal to the general-purpose processing unit 33 when the value indicating the first communication mode is set. The storage media controller 32 may be also configured to output an interrupt signal to the high-speed transfer processing unit 34 when the value indicating the second communication mode is set, and output an interrupt signal to the general-purpose processing unit 33 when the value indicating the first communication mode is set.

Subsequently, the high-speed reception ending unit 37 of the receiving terminal stops the high-speed transfer processing unit 34 when the reception of data in a data volume notified by the high-speed transfer start request is completed (S204). The high-speed reception ending unit 37 sets the value indicating the first communication mode in the communication mode management unit 35, and transmits the high-speed transfer end request (S205). The setting of the value in the communication mode management unit 35 may be also performed by another processing unit such as the general-purpose processing unit 33.

The operation of the receiving terminal has been described above.

As described above, in the first embodiment, the receiving terminal transmits the high-speed transfer start response after starting up the high-speed transfer processing unit. Accordingly, the transmitting side can be prevented from starting the data transfer before the receiving side is switched to the high-speed transfer processing unit.

The transmitting side starts up the high-speed transfer processing unit after receiving the high-speed transfer start response from the receiving terminal. Accordingly, the transmitting side can be prevented from starting the data transfer before the receiving side is switched to the high-speed transfer processing unit.

As described above, in the present embodiment, the start and end timings are synchronized between two communication devices by using the transmission and reception of the control packets (the high-speed transfer start request, the high-speed transfer start response, the high-speed transfer end request, the high-speed transfer end response, or the like) from a respective one or the two communication devices. Consequently, the communications by the general-purpose processing unit and the data transfer by the high-speed transfer processing unit can be mixedly performed without disrupting the data transfer.

Second Embodiment

First, a technological background of the present embodiment will be described.

When the general-purpose processing unit or the high-speed transfer processing unit controls the storage media controller or the communication controller, the general-purpose processing unit or the high-speed transfer processing unit accesses an interface of each controller and notifies control information. The controller performs processing based on the notified control information. The controller notifies the general-purpose processing unit or the high-speed transfer processing unit that the processing has been completed (normal completion, abnormal completion) by using the interrupt signal.

When the processing of the high-speed transfer processing unit and the processing of the general-purpose processing unit are switched, the output destination of the interrupt signal from each controller is also switched to the side that is performing the processing. The side that has set the control information can thereby receive the interrupt signal. Accordingly, the controller can be correctly controlled.

However, when the control packet is transmitted by using the general-purpose processing unit, more specifically, a general-purpose driver of the general-purpose processing unit after starting up the high-speed transfer processing unit (e.g., S202 and S203 in FIG. 2) as in the first embodiment, the general-purpose driver may not be able to receive the interrupt signal indicative of transmission completion of the control packet from the communication controller since the output destination of the interrupt signal is already set to the high-speed transfer processing unit. In this case, interrupt processing from the communication controller cannot be executed.

Thus, in the second embodiment, the general-purpose driver of the general-purpose processing unit is enabled to correctly perform the interrupt processing from each controller when the general-purpose driver controls each controller during the operation of the high-speed transfer processing unit.

In the following, the present embodiment will be described in detail.

Figure 3:
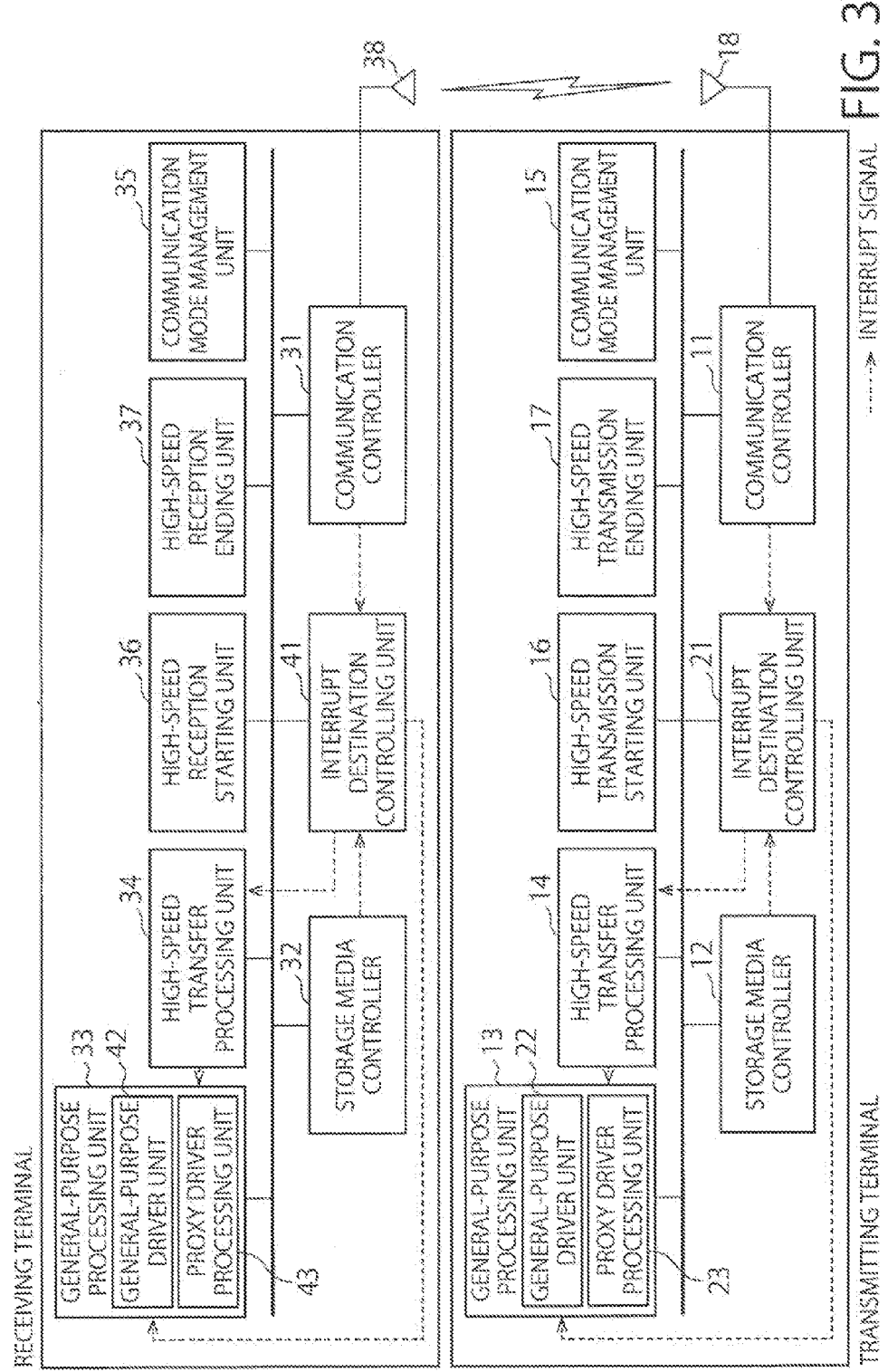
FIG. 3 is a block diagram illustrating communication devices according to a second embodiment.

FIG. 3 is a block diagram illustrating communication devices according to the second embodiment. A transmitting terminal and a receiving terminal are shown as the communication devices. The same or corresponding elements as those in FIG. 1 are assigned the same reference numerals, and the overlapping description is omitted.

The transmitting terminal includes an interrupt destination controlling unit 21, a general-purpose driver unit 22, and a proxy driver processing unit 23 in addition to the elements described in the first embodiment. The general-purpose driver unit 22 and the proxy driver processing unit 23 are provided in the general-purpose processing unit 13.

The receiving terminal includes an interrupt destination controlling unit 41, a general-purpose driver unit 42, and a proxy driver processing unit 43 in addition to the elements described in the first embodiment. The general-purpose driver unit 42 and the proxy driver processing unit 43 are provided in the general-purpose processing unit 33.

The interrupt destination controlling units 21 and 41 receive interrupt signals from the communication controllers 11 and 31, and the storage media controllers 12 and 32. The interrupt destination controlling units 21 and 41 output the interrupt signals to the general-purpose processing units 13 and 33 in the first communication mode, and output the interrupt signals to the high-speed transfer processing units 14 and 34 in the second communication mode.

The high-speed transfer processing units 14 and 34 process the interrupt signals from the interrupt destination controlling units 21 and 41 when the interrupt signals are predetermined interrupt signals. The high-speed transfer processing units 14 and 34 output interrupt signals (first interrupt signals) as an interrupt cause of the high-speed transfer processing units 14 and 34 to the general-purpose processing units 13 and 33 when the interrupt signals are interrupt signals regarding an exceptional cause (interrupt signals other than the predetermined interrupt signals). When there occurs an event that should be processed by the general-purpose processing units 13 and 33 instead of the high-speed transfer processing units 14 and 34, the interrupt signals are similarly output to the general-purpose processing units 13 and 33.

The general-purpose driver units 22 and 42 are device drivers for controlling the communication controllers 11 and 31, and the storage media controllers 12 and 32. The general-purpose driver units 22 and 42 control the communication controllers 11 and 31, and the storage media controllers 12 and 32, and perform processing corresponding to the interrupt cause upon receiving the interrupt signals from the communication controllers 11 and 31, and the storage media controllers 12 and 32.

The proxy driver processing units 23 and 43 receive the interrupt signals input from the high-speed transfer processing units 14 and 34 in the second communication mode. The proxy driver processing units 23 and 43 process the interrupt signals, and thereby perform interrupt processing from the communication controllers 11 and 31, and the storage media controllers 12 and 32. That is, the proxy driver processing unit performs the interrupt processing from the controller instead of the general-purpose driver unit where the interrupt processing is to be performed by the general-purpose driver unit under ordinary circumstances.

Figure 4:
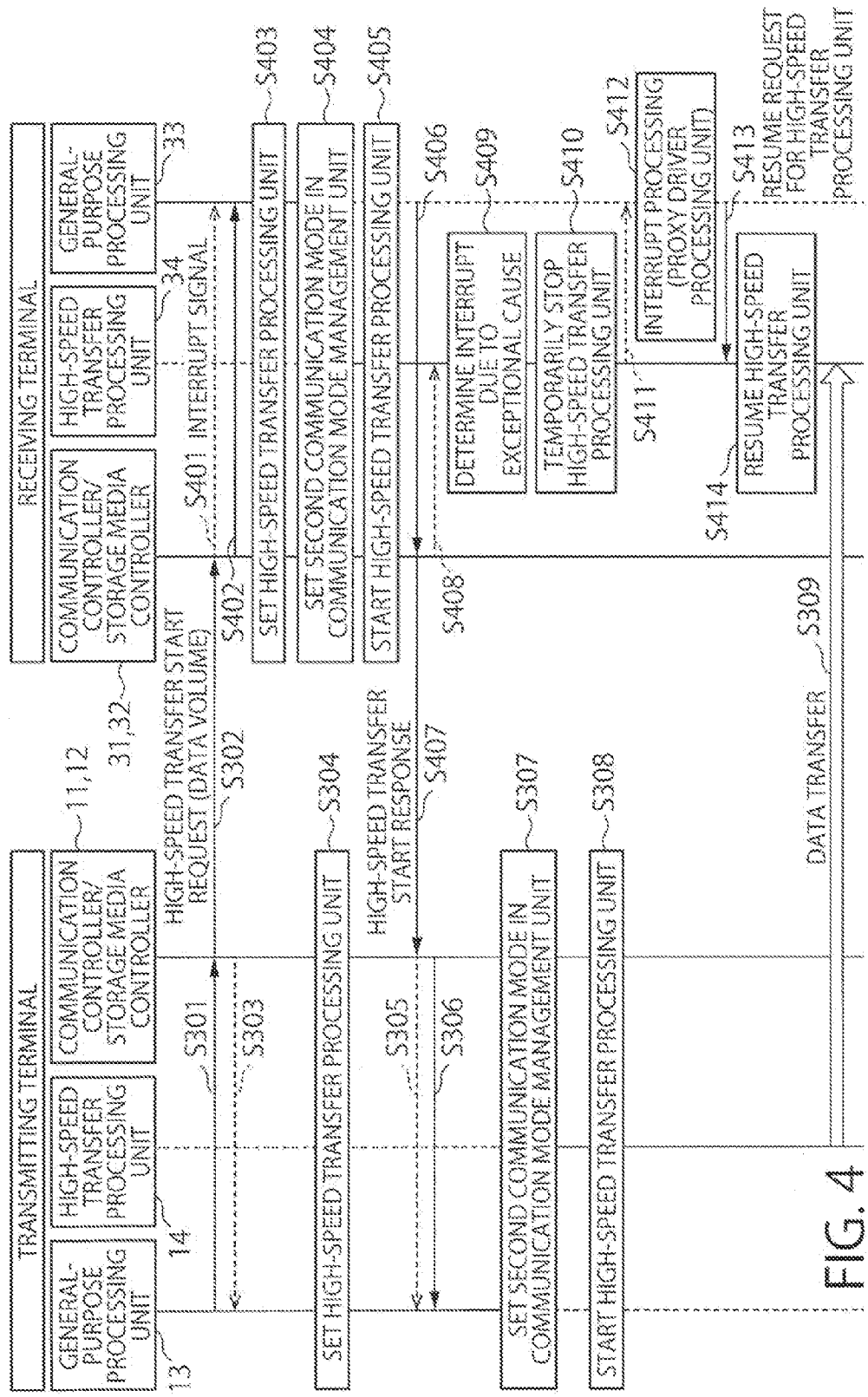
FIG. 4 is a sequence diagram illustrating operations of a transmitting terminal and a receiving terminal according to the second embodiment.

Next, operations of the communication devices according to the second embodiment will be described based on FIGS. 3 and 4. FIG. 4 is a sequence diagram illustrating operations of the transmitting terminal and the receiving terminal according to the second embodiment. The overlapping description on the same operations as those of the first embodiment will be simplified or omitted.

The general-purpose processing unit 13 of the transmitting terminal transmits a high-speed transfer start request via the communication controller 11 (S301, S302). The communication controller 11 outputs an interrupt signal indicative of transmission completion to the interrupt destination controlling unit 21. The interrupt destination controlling unit 21 outputs the interrupt signal to the general-purpose processing unit 13 since the value indicating the first communication mode is stored in the communication mode management unit 15 (S303).

The general-purpose processing unit 13 of the transmitting terminal sets information necessary for the data transfer in the high-speed transfer processing unit 14 (S304).

Subsequently, the general-purpose processing unit 13 receives a high-speed transfer start response from the receiving terminal (S306). To be more specific, when the communication controller 11 receives the high-speed transfer start response (S407), the communication controller 11 outputs an interrupt signal to the interrupt destination controlling unit 21. The interrupt destination controlling unit 21 outputs the interrupt signal from the communication controller 11 to the general-purpose processing unit 13 since the value indicating the first communication mode is stored in the communication mode management unit 15 (S305). When receiving the interrupt signal, the general-purpose processing unit 13 accesses the communication controller 11 to acquire the high-speed transfer start response (S306).

The high-speed transmission starting unit 16 of the transmitting terminal sets the value indicating the second communication mode in the communication mode management unit 15 (S307), and starts up the high-speed transfer processing unit 14 (S308). The started-up high-speed transfer processing unit 14 starts the data transfer (S309).

Meanwhile, in the receiving terminal, the general-purpose processing unit 33 receives the high-speed transfer start request (S402). To be more specific, the communication controller 31 outputs an interrupt signal indicative of reception of the high-speed transfer start request. The interrupt destination controlling unit 41 outputs the interrupt signal to the general-purpose processing unit 33 since the value indicating the first communication mode is stored in the communication mode management unit 35 (S401). The general-purpose processing unit 33 accesses the communication controller 31 to acquire the high-speed transfer start request (S402).

The general-purpose processing unit 33 of the receiving terminal sets information necessary for the data transfer in the high-speed transfer processing unit 34 (S403). The high-speed reception starting unit 36 sets the value indicating the second communication mode in the communication mode management unit 35 (S404), and starts up the high-speed transfer processing unit 34 (S405). The interrupt destination controlling unit 41 outputs the interrupt signals from the communication controller 31 and the storage media controller 32 to the high-speed transfer processing unit 34 upon setting of the value indicating the second communication mode in the communication mode management unit 35.

When the high-speed transfer processing unit 34 is started up, the general-purpose processing unit 33 transmits the high-speed transfer start response by using the general-purpose driver unit 42 (S406, S407). When the transmission of the high-speed transfer start response is completed, the communication controller outputs an interrupt signal indicative of transmission completion to the interrupt destination controlling unit 41. The interrupt destination controlling unit 41 notifies, to the high-speed transfer processing unit 34, the interrupt signal since the value indicating the second communication mode is stored in the communication mode management unit 35 (S408).

The high-speed transfer processing unit 34 determines that the notified interrupt signal is an interrupt regarding an exceptional cause that is not to be processed by itself (S409). The high-speed transfer processing unit 34 temporarily stops its operation (S410). The high-speed transfer processing unit 34 then notifies, to the general-purpose processing unit 33, the interrupt signal as an interrupt cause of the high-speed transfer processing unit 34 (S411).

The proxy driver processing unit 43 of the general-purpose processing unit 33 determines that the cause of the notified interrupt signal is an interrupt regarding the transmission completion of the high-speed transfer start response from the general-purpose driver unit 42. The proxy driver processing unit 43 processes the interrupt (interrupt regarding the transmission completion) instead of the general-purpose driver unit 42 (S412).

Subsequently, the proxy driver processing unit 43 notifies, to the high-speed transfer processing unit 34, a resume request for the data transfer (S413). When receiving the resume request, the high-speed transfer processing unit 34 resumes the data transfer (S414).

In the example shown in FIG. 4, the data transfer (S309) is arranged below the resumption of the data transfer (S414). However, of course, the data transfer may be started before the processing (temporary stop processing) in step S410 in the receiving terminal.

The operation of the second embodiment has been described above.

Although the interrupt regarding the transmission completion of the high-speed transfer start response has been described as an example of the exceptional interrupt cause of the high-speed transfer processing unit 34 in the above description, the proxy driver processing unit 43 also similarly processes transmission and reception of another exceptional packet that is not to be processed by the high-speed transfer processing unit 34, an abnormal state notification of the communication controller 31 or the storage media controller 32, or the like.

As described above, in the second embodiment, the proxy driver processing unit executes the interrupt processing when the general-purpose driver controls each controller during the operation of the high-speed transfer processing unit. Accordingly, the interrupt to the general-purpose driver from each controller can be correctly processed even during the operation of the high-speed transfer processing unit.

Third Embodiment

First, a technological background of the present embodiment will be described.

Power consumption can be reduced by causing the general-purpose processing unit to enter sleep during the data transfer processing by the high-speed transfer processing unit. However, in the conventional techniques, the general-purpose processing unit does not have any means for knowing at which timing the high-speed transfer processing unit starts the data transfer. Thus, the general-purpose processing unit cannot appropriately enter sleep.

For example, even if the general-purpose processing unit starts up the high-speed transfer processing unit and enters sleep, the high-speed transfer processing unit may shortly encounter an exceptional event. In this case, the general-purpose processing unit is woken up. The sleep is wasted in terms of time and power.

In the transmitting terminal, it is difficult to actually confirm that the general-purpose processing unit can enter sleep until it is confirmed that the high-speed transfer processing unit successfully reads out or writes data to the storage media controller and the data transfer using OBEX is started. Thus, the general-purpose processing unit is not recommended to enter sleep.

Accordingly, in the third embodiment, a method for appropriately causing the general-purpose processing unit to enter sleep is proposed.

Figure 5:
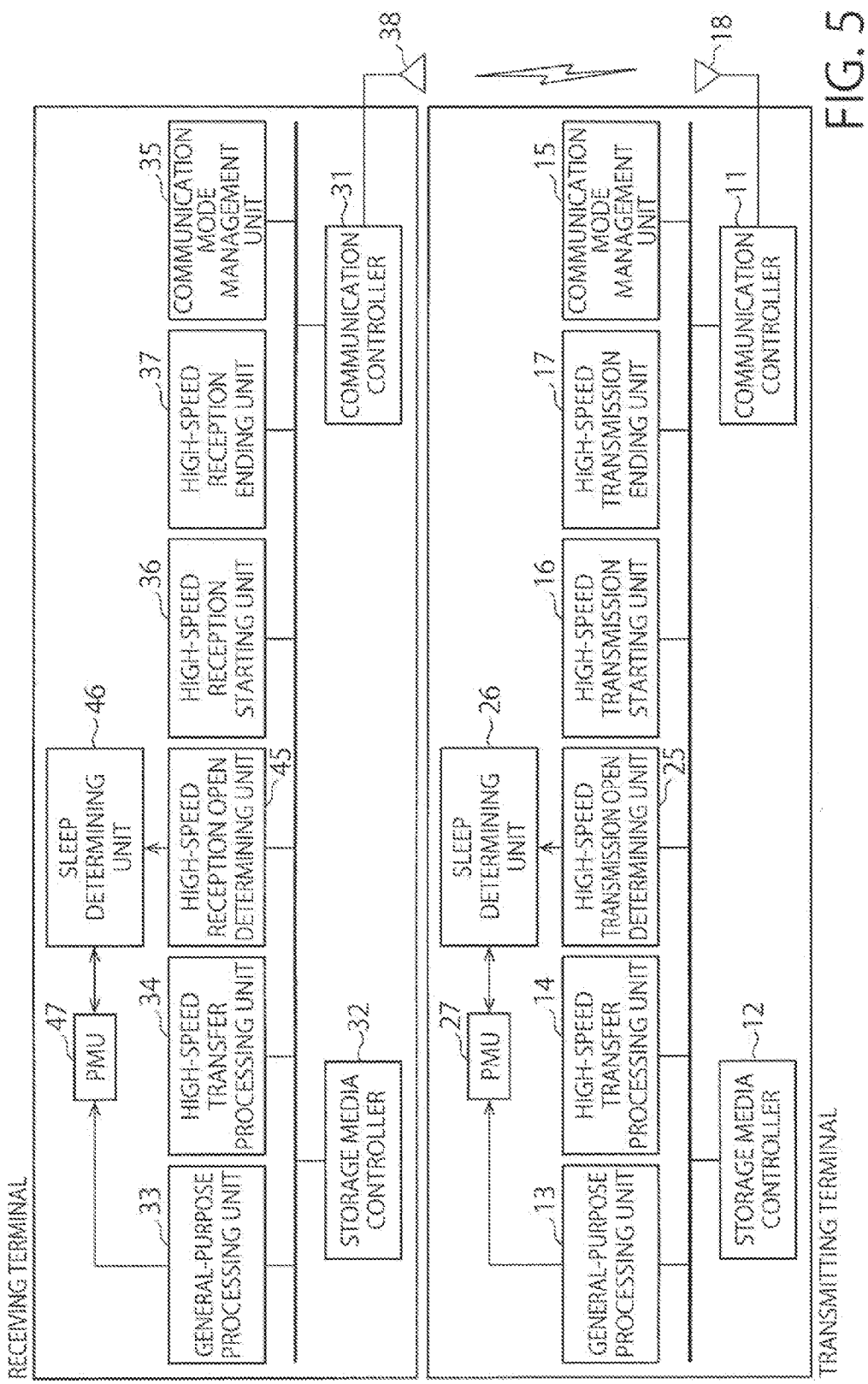
FIG. 5 is a block diagram illustrating communication devices according to a third embodiment.

FIG. 5 is a block diagram illustrating communication devices according to the third embodiment. A transmitting terminal and a receiving terminal are shown as the communication devices.

The transmitting terminal and the receiving terminal include PMUs (power management units) 27 and 47, high-speed transfer open determining units 25 and 45, and sleep determining units 26 and 46 in addition to the blocks shown in FIG. 1. The high-speed transfer open determining units 25 and 45, and the sleep determining units 26 and 46 may be achieved by software executed by the general-purpose processing units 13 and 33, or by hardware. In the present embodiment, a case in which the high-speed transfer open determining units 25 and 45, and the sleep determining units 26 and 46 are achieved by software executed by the general-purpose processing units 13 and 33 is assumed.

The PMUs 27 and 47 perform power saving control of the general-purpose processing units (CPU+RAM) 13 and 33.

The high-speed transfer open determining units 25 and 45 determine whether or not a data path is opened for the data transfer performed by the high-speed transfer processing units 14 and 34. The details will be described below.

The sleep determining units 26 and 46 determine that the general-purpose processing units 13 and 33 can be put into a sleep state when receiving a sleep request from the PMUs 27 and 47, and a data path open notification from the high-speed transfer open determining units 25 and 45. The sleep determining units 26 and 46 issue a sleep response to the PMUs 27 and 47. When receiving the sleep response, the PMUs 27 and 47 put the general-purpose processing units 13 and 33 into a sleep state. The sleep state includes any state in which power consumption is lower than that before sleep. For example, power supply to the entire portion of the general-purpose processing unit may be stopped, or power may be supplied to only a portion of the circuit. Not only the general-purpose processing unit, but the PMU itself may shift into a sleep state.

Figure 6:
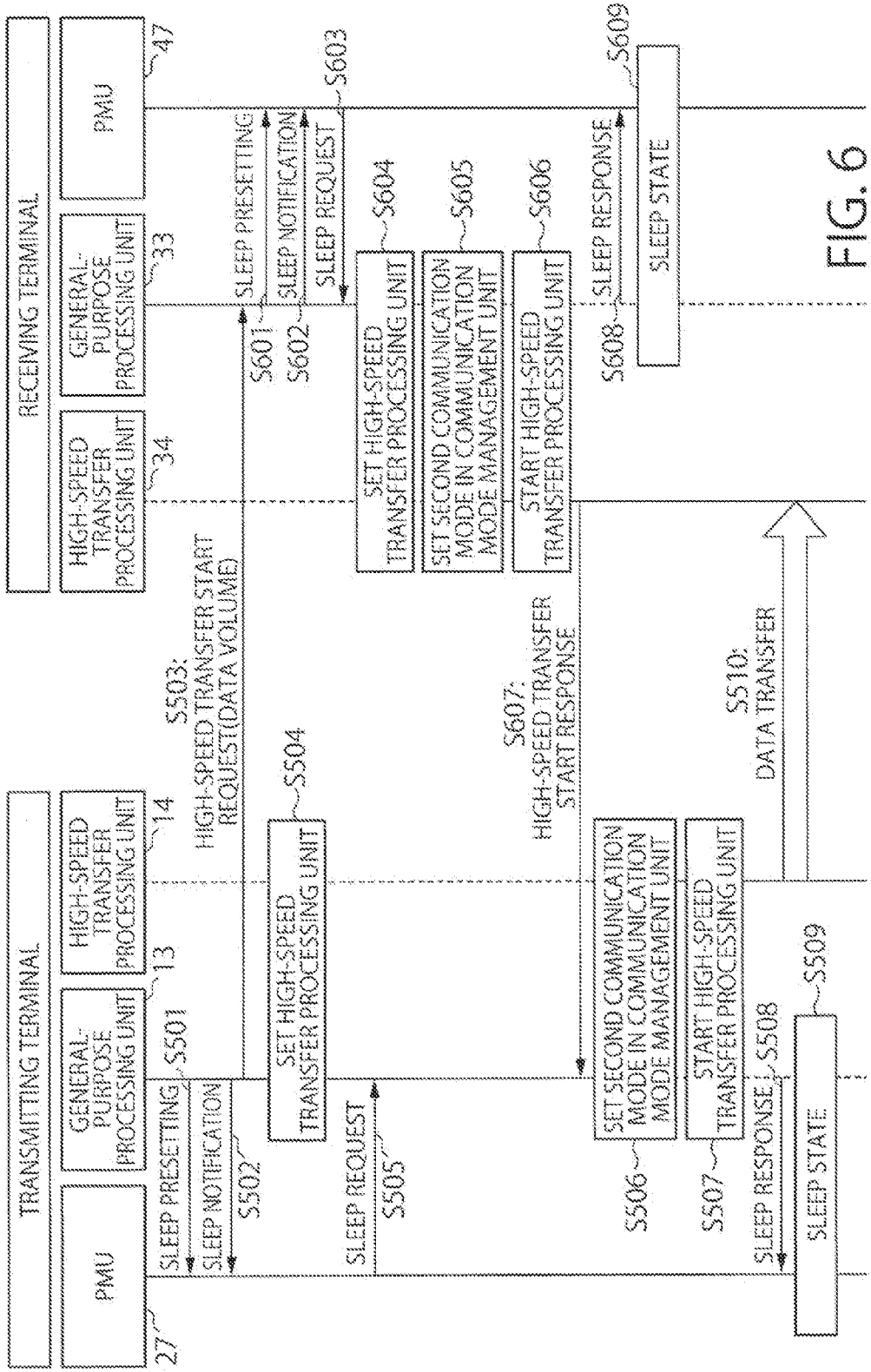
FIG. 6 is a sequence diagram illustrating operations of a transmitting terminal and a receiving terminal according to the third embodiment.

Next, operations of the communication devices according to the third embodiment will be described based on FIGS. 5 and 6. FIG. 6 is a sequence diagram illustrating operations of the transmitting terminal and the receiving terminal according to the third embodiment.

First, the operation of the transmitting terminal will be described. Since basic operations regarding the data transfer are similar to those of the first embodiment, the overlapping description is simplified or omitted.

First, the general-purpose processing unit 13 of the transmitting terminal performs setting necessary for sleep in the PMU 27 (S501), and issues a sleep notification to the PMU (S502). Examples of the necessary setting include start conditions in the sleep, and timer setting.

The general-purpose processing unit 13 transmits a high-speed transfer start request to the receiving terminal (S503).

The general-purpose processing unit 13 sets information necessary for the data transfer in the high-speed transfer processing unit 14 (S504).

When receiving the above sleep notification, the PMU 27 of the transmitting terminal issues a sleep request to the sleep determining unit 26 (S505). The sleep request may be issued before setting the high-speed transfer processing unit (S504).

After that, when a high-speed transfer start response from the receiving terminal is received (S607), the high-speed transmission starting unit 16 of the transmitting terminal sets the value indicating the second communication mode in the communication mode management unit 15 (S506), and starts up the high-speed transfer processing unit 14 (S507).

Subsequently, the high-speed transfer open determining unit 25 of the transmitting terminal detects that a data path is opened when the value indicating the second communication mode is set in the communication mode management unit 15, when the high-speed transfer processing unit 14 is started up, or when the high-speed transfer start response is received. The high-speed transfer open determining unit 25 notifies the detection to the sleep determining unit 26. The opening of the data path may be also detected by using another method as described below.

Subsequently, the sleep determining unit 26 of the transmitting terminal determines that the general-purpose processing unit 13 can be put into a sleep state when the sleep request has been issued from the PMU 27 and when the data path open notification from the high-speed transfer open determining unit 25 has been received. The sleep determining unit 26 issues a sleep response to the PMU 27 (S508).

The PMU 27 of the transmitting terminal receives the sleep response, and shifts the general-purpose processing unit 13 and itself into a sleep state after controlling a power supply domain and storing the state of the general-purpose processing unit 13 (S509).

The high-speed transfer processing unit 14 started up by the high-speed transmission starting unit 16 also starts data transmission (S510).

The operation of the transmitting terminal has been described above.

Next, the operation of the receiving terminal will be described.

First, after receiving the high-speed transfer start request (S503) transmitted from the transmitting terminal, the general-purpose processing unit 33 of the receiving terminal performs setting necessary for sleep in the PMU 47 (S601), and issues a sleep notification to the PMU 47 (S602).

When receiving the sleep notification, the PMU 47 of the receiving terminal issues a sleep request to the sleep determining unit 46 (S603).

When receiving the above high-speed transfer start request, the general-purpose processing unit 33 of the receiving terminal sets information necessary for the data transfer in the high-speed transfer processing unit 34 (S604). The high-speed reception starting unit 36 sets the value indicating the second communication mode in the communication mode management unit 35 (S605), and starts up the high-speed transfer processing unit 34 (S606).

The started-up high-speed transfer processing unit 34 transmits the high-speed transfer start response to the transmitting terminal (S607).

The high-speed transfer open determining unit 45 of the receiving terminal detects that a data path is opened when the value indicating the second communication mode is set in the communication mode management unit 35, or when the high-speed transfer processing unit 34 is started up. The high-speed transfer open determining unit 45 notifies the detection to the sleep determining unit 46. The opening of the data path may be also detected by using another method as described below.

The sleep determining unit 46 determines that the general-purpose processing unit 33 can be put into a sleep state when the sleep request has been issued from the PMU 47 and when the data path open notification from the high-speed transfer open determining unit 45 has been received. The sleep determining unit 46 issues a sleep response to the PMU 47 (S608).

The PMU 47 receives the sleep response, and shifts the general-purpose processing unit 33 and itself into a sleep state after controlling a power supply domain and storing the state of the general-purpose processing unit (S609).

The operation of the receiving terminal has been described above.

Examples other than those described above will be described as data-path open conditions. In the receiving side, the examples include completion of the interrupt processing regarding the transmission completion of the high-speed transfer response by the proxy driver processing unit (see FIG. 4) of the second embodiment, and reception of a packet composed only of a Body header by the high-speed transfer processing unit in the second communication mode in a case in which a packet that should be processed by the high-speed transfer processing unit, e.g., an OBEX packet is assumed. In the transmitting side, the examples include starting of the data transfer from the high-speed transfer processing unit.

The communication device in the first to third embodiments may also be realized using a general-purpose computer device as basic hardware. That is, each unit in the communication device can be realized by causing a processor mounted in the above described computer device to execute a program. In this case, the communication device may be realized by installing the above described program in the computer device beforehand or may be realized by storing the program in a storage medium such as a CD-ROM or distributing the above described program over a network and installing this program in the computer device as appropriate.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A communication device which communicates with a target communication device, comprising:
   a communication controller;
   a general-purpose processing unit configured to communicate with the target communication device via the communication controller;
   a data transfer processing unit configured to receive data from the target communication device via the communication controller; and
   a starting unit configured to start up the data transfer processing unit,
   wherein the general-purpose processing unit receives a data transfer start request from the target communication device,
   the starting unit starts up the data transfer processing unit when the general-purpose processing unit receives the data transfer start request,
   the general-purpose processing unit or the data transfer processing unit notifies a data transfer start response to the target communication device after the data transfer processing unit is started up,
   the communication device, further comprises:
   a mode management unit configured to store one of a first value and a second value;
   a unit configured to set the second value in the mode management unit when the general-purpose processing unit receives the data transfer start request; and
   an interrupt destination controlling unit configured to transfer an interrupt signal output from the communication controller to the general-purpose processing unit when the first value is stored in the mode management unit, and configured to transfer the interrupt signal output from the communication controller to the data transfer processing unit when the second value is stored in the mode management unit,
   upon receiving the interrupt signal from the communication controller, the data transfer processing unit processes the interrupt signal when the interrupt signal is a predetermined interrupt signal, and outputs a first interrupt signal to the general-purpose processing unit when the interrupt signal is other than the predetermined interrupt signal, and
   the general-purpose processing unit includes a general-purpose driver unit configured to process the interrupt signal from the communication controller, and a proxy driver processing unit configured to process the first interrupt signal input from the data transfer processing unit.

2. The communication device according to claim 1,
   wherein the data transfer processing unit temporarily stops the data transfer when determining that the interrupt signal is an interrupt signal other than the predetermined interrupt signal, and
   resumes the data transfer after the proxy driver processing unit processes the first interrupt signal.

3. The communication device according to claim 1, further comprising
   a power management unit for the general-purpose processing unit,
   wherein the power management unit sets the general-purpose processing unit into a low power consumption state after the general-purpose processing unit or the data transfer processing unit transmits the data transfer start response.

4. The communication device according to claim 3, wherein the power management unit sets the general-purpose processing unit into the low power consumption state after the data transfer processing unit started up by the starting unit starts data reception from the target communication device.

5. The communication device according to claim 1, wherein the general-purpose processing unit transmits the data transfer start request to the target communication device, and receives the data transfer start response from the target communication device,
the starting unit starts up the data transfer processing unit when the general-purpose processing unit receives the data transfer start response, and
the data transfer processing unit as started up starts data transfer to the target communication device.

6. The communication device according to claim 5, further comprising
a power management unit for the general-purpose processing unit,
wherein the power management unit sets the general-purpose processing unit into a low power consumption state after the data transfer processing unit is started up.

7. The communication device according to claim 6, wherein the power management unit sets the general-purpose processing unit into the low power consumption state after the data transfer processing unit started up by the starting unit starts the data transfer.

8. A non-transitory computer-readable medium having instructions stored therein which causes a computer communicating with a target communication device to execute steps comprising:
receiving a data transfer start request from the target communication device via a communication controller;
starting up a data transfer processing unit in order to receive data from the target communication device via the communication controller when the data transfer start request is received;
notifying a data transfer start response to the target communication device after the data transfer processing unit is started up;
storing one of a first value and a second value in a mode management unit;
setting the second value in the mode management unit when the data transfer start request is received;
transferring an interrupt signal output from the communication controller to a general-purpose processing unit when the first value is stored in the mode management unit, and transferring the interrupt signal output from the communication controller to the data transfer processing unit when the second value is stored in the mode management unit;
processing the interrupt signal input to the data transfer processing unit when the interrupt signal is a predetermined interrupt signal, and outputting a first interrupt signal to the general-purpose processing unit when the interrupt signal input to the data transfer processing unit is an interrupt signal other that the predetermined interrupt signal; and
processing, by the general-purpose processing unit, the interrupt signal from the communication controller, and processing, by the general-purpose processing unit, the first interrupt signal input from the data transfer processing unit.

9. The non-transitory computer-readable medium according to claim 8, further having instructions causing the computer to execute:
temporarily stopping data transfer by the data transfer processing unit when the interrupt signal is other than the predetermined interrupt signal; and
resuming the data transfer by the data transfer processing unit after the first interrupt signal is processed.

10. The non-transitory computer-readable medium according to claim 8, further having instructions causing the computer to execute
shifting into a low power consumption state after the data transfer start response is returned to the target communication device.

11. The non-transitory computer-readable medium according to claim 10, wherein
the shifting into the low power consumption state is performed after the data transfer processing unit starts data reception from the target communication device.

12. The non-transitory computer-readable medium according to claim 8, further having instructions causing the computer to execute:
transmitting the data transfer start request to the target communication device;
receiving the data transfer start response from the target communication device; and
starting up the data transfer processing unit so as to execute data transfer to the target communication device when the data transfer start response is received.

13. The non-transitory computer-readable medium according to claim 12, further having instructions causing the computer to execute
shifting into a low power consumption state after the data transfer processing unit is started up.

14. The non-transitory computer-readable medium according to claim 13, wherein
the shifting into the low power consumption state is performed after the data transfer processing unit starts the data transfer to the target communication device.

15. A method in a communication device which communicates with a target communication device, comprising:
receiving a data transfer start request from the target communication device;
starting up a data transfer processing unit in order to receive data from the target communication device when the data transfer start request is received; and
notifying a data transfer start response to the target communication device after the data transfer processing unit is started up;
storing one of a first value and a second value in a mode management unit;
setting the second value in the mode management unit when the data transfer start request is received;
transferring an interrupt signal output from the communication controller to a general-purpose processing unit when the first value is stored in the mode management unit, and transferring the interrupt signal output from the communication controller to the data transfer processing unit when the second value is stored in the mode management unit;
processing the interrupt signal input to the data transfer processing unit when the interrupt signal is a predetermined interrupt signal, and outputting a first interrupt signal to the general-purpose processing unit when the interrupt signal input to the data transfer processing unit is an interrupt signal other that the predetermined interrupt signal; and processing, by the general-purpose processing unit, the interrupt signal from the communication controller, and processing, by the general-purpose processing unit, the first interrupt signal input from the data transfer processing unit.

* * * * *